UNITED STATES PATENT OFFICE.

JEAN HUBERT LOUIS DE BATS, OF ZELIENOPLE, PENNSYLVANIA, ASSIGNOR, BY MESNE ASSIGNMENTS, TO LAVA CRUCIBLE COMPANY OF PITTSBURGH, OF PITTSBURGH, PENNSYLVANIA, A CORPORATION OF PENNSYLVANIA.

METHOD OF MAKING GRAPHITE CRUCIBLES.

1,374,909. Specification of Letters Patent. Patented Apr. 19, 1921.

No Drawing. Application filed May 31, 1918, Serial No. 237,503. Renewed August 5, 1920. Serial No. 401,563.

*To all whom it may concern:*

Be it known that I, JEAN HUBERT LOUIS DE BATS, a resident of Zelienople, in the county of Butler and State of Pennsylvania, have invented a new and useful Improvement in Methods of Making Graphite Crucibles, of which the following is a specification.

This invention relates to crucibles or pots for use in melting iron, steel, copper, brass and other metals and alloys or glass or similar substances, and to the method of making the same.

The object of the invention is to provide a graphite or clay crucible or pot which has a lasting and adherent glaze on its surface and which is of superior quality and has a longer life than such crucibles or pots as heretofore made.

Crucibles or pots such as used in the manufacture of crucible steel, or for melting other ferrous or non-ferrous metals, or glass, are formed of graphite or of clay mixed with graphite, with or without the admixture of sand thereto. It is desirable that such crucibles or pots be provided with a glazed surface. Heretofore a glaze has been formed largely by the silica of the sand in the mixture, which exudes to the surface under the action of the heat of the furnace in which the crucible or pot is used and forms a glaze on the surface. This glaze, however, is not very adherent, spalling off at each heat and causing a rapid wearing down of the crucible, thereby shortening its life.

I have discovered that if certain non-ferrous metals in a finely divided metallic state, be incorporated in the clay or mixture of clay and graphite from which the crucible or pot is formed, it causes the formation of a glaze which is very adherent, which does not readily spall off, and which, therefore, protects the body of the crucible or pot and increases its life.

According to my invention, the crucible or pot is made in the usual way, either from graphite, clay, or clay mixed with graphite, with or without the admixture of sand therewith, depending upon the use to which the crucible is to be put, except that there is mixed with the graphite, clay, or clay and graphite, prior to molding, some non-ferrous metal, in a finely divided or powdered form, or in the form of the so-called "grog." Various metals are suitable for the purpose, particularly copper, nickel, Monel metal (which includes both nickel and copper), chromium, cobalt, and other non-ferrous metals or alloys or mixtures thereof. This metal, in a finely divided condition, is mixed with the clay or other material in the usual way, prior to molding. The amount of such metal used will depend upon the use to which the crucible or pot is to be put, but anywhere from 1 to 10 per cent. is suitable. The finer the metal is, the lesser the amount thereof that can be used.

In the use of the crucible or pot with the metallic metal incorporated therein, as described, the heat in the furnace causes the metal to exude to the surface, and it there forms a metallic silicate and produces a very adherent glaze, which does not spall off readily and which persists during many heats of the crucible, thus preventing the crucible from wearing down and greatly prolongs its life.

Where the crucible is to be subjected to relatively low temperatures, it is preferred to use copper, as it more readily exudes and forms the metallic silicate above described, but, where the crucible is to be subjected to higher temperatures, metals having a higher melting point may be employed, such as nickel or chromium.

The process can be carried out by any skilled crucible maker, as it requires no variation from the processes heretofore used other than mixing with the graphite, or the clay and graphite, prior to molding, the necessary amount of the described metal in a finely divided state. The crucible is molded, dried and burned in the usual way. If, however, it is desired that the usual long continued drying of graphite crucibles be dispensed with, there may also be mixed with the graphite, or the clay and graphite, a small amount of aluminum or magnesium, or mixtures or alloys of the same, in a finely divided state, as more fully described in my application of even date herewith, Serial No. 237502.

The method is applicable for making crucibles or pots formed entirely of graphite or of clay and graphite, such as are largely used in the steel and metal industries. The process is economical and results in the production of a crucible having a much longer life than similar crucibles or pots as heretofore made.

What I claim is:

1. The method of making crucibles or pots containing clay, which consists in mixing non-ferrous metal with the material from which the crucible or pot is formed, and forming the crucible or pot therefrom, whereby in the use of the crucible or pot the metal forms a metallic silicate coating on the surface thereof.

2. The method of making crucibles or pots containing clay and graphite, which consists in mixing non-ferrous metal with the material from which the crucible or pot is formed, and forming the crucible or pot therefrom, whereby in the use of the crucible or pot the metal forms a metallic silicate coating on the surface thereof.

3. The method of making crucibles or pots containing clay, which consists in mixing non-ferrous metal in a finely divided state with the material from which the crucible or pot is formed, and forming the crucible or pot therefrom, whereby in the use of the crucible or pot a metallic silicate coating is formed on the surface thereof.

4. The method of making crucibles or pots containing clay and graphite, which consists in mixing non-ferrous metal in a finely divided state with the material from which the crucible or pot is formed, and forming the crucible or pot therefrom, whereby in the use of the crucible or pot a metallic silicate coating is formed on the surface thereof.

5. The method of making crucibles or pots containing clay, which consists in mixing copper-containing metal with the material from which the crucible or pot is formed, and forming the crucible or pot therefrom, whereby in the use of the crucible or pot the metal forms a metallic silicate coating on the surface thereof.

6. The method of making crucibles or pots containing clay and graphite, which consists in mixing copper-containing metal with the material from which the crucible or pot is formed, and forming the crucible or pot therefrom, whereby in the use of the crucible or pot a metallic silicate coating is formed on the surface thereof.

7. A crucible or pot containing clay and having incorporated therein a non-ferrous metal in a finely divided form.

8. A crucible or pot containing clay and having incorporated therein copper-containing metal in a finely divided form.

9. A crucible or pot containing clay and graphite and having incorporated therein a non-ferrous metal in a finely divided form.

10. A crucible or pot containing clay and graphite and having incorporated therein a copper-containing metal in a finely divided form.

In testimony whereof I have hereunto set my hand.

JEAN HUBERT LOUIS DE BATS.

Witness:
GLENN H. LERESCHE.